I. J. RICHARDSON.
Corn Sheller.
No. 6,320.
Patented April 2, 1849.
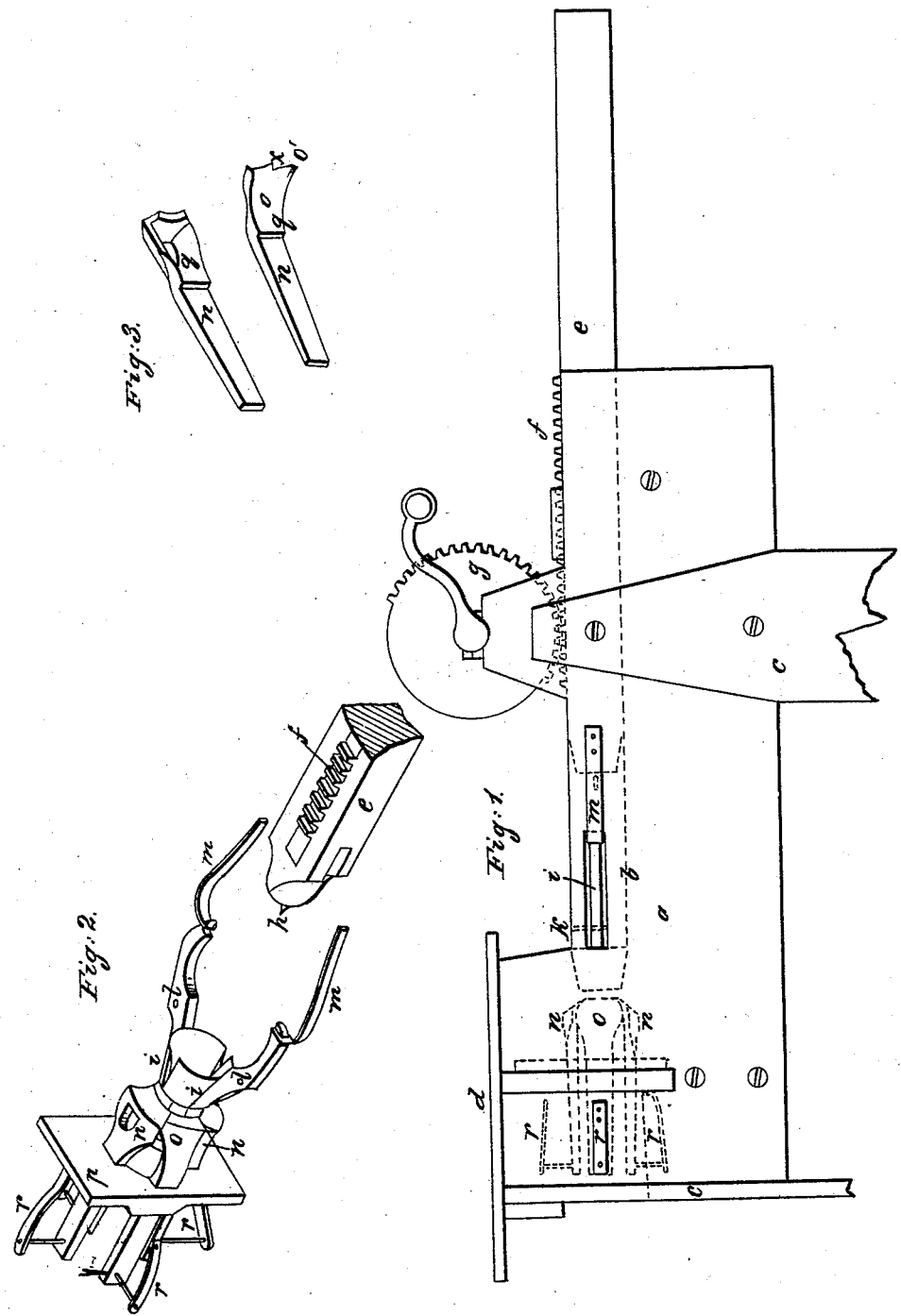

UNITED STATES PATENT OFFICE.

I. J. RICHARDSON, OF NEW YORK, N. Y.

CORN-SHELLER.

Specification of Letters Patent No. 6,320, dated April 2, 1849.

*To all whom it may concern:*

Be it known that I, ISRAEL J. RICHARDSON, of New York, in the county of New York and State of New York, have invented a new and useful Improvement in Machinery for Shelling Corn, and that the following is a full, clear, and exact description of the principle or character which distinguishes it from all other things before known, and of the usual manner of making, modifying, and using the same, reference being had to the accompanying drawing, which forms a part of this specification, in which—

Figure 1, is a side elevation. Fig. 2, is a perspective view of the jaws and guide in their relative positions without the frame. Fig. 3, parts of the jaws detached.

I am aware that several machines have been made for shelling corn by driving the ear through surrounding jaws that have the power of expanding to admit different sized cobs to pass through, while the corn is forced off; but these have all been so difficult to put into use, requiring much skill and dexterity in the operative, that comparatively but little work could be performed with them for the amount of labor expended.

The modification which I propose is constructed as follows: the frame is composed of two side pieces (*a*) which, together with a bottom piece connecting them on the dotted line (*b*) Fig. 2 form a trough; this trough is supported on legs (*c*) of a convenient height, and one end of it is elevated, as represented in the drawing, to receive the shelling jaws, and also to support a seat (*d*) on which the operator sits. Within the trough a piston (*e*) fits, that fills its cross section on the upper surface, of which there is a rack (*f*,) into which a section spur wheel (*g*,) gears; this wheel is turned by a crank that moves the piston back and forth; the inner end of the piston is chamfered off, as shown in the drawing Fig. 2 and has in its extreme end a pointed spike (*h*,).

In the sides of the trough two irons (*i*) which I denominate guides, are jointed; they are curved bars, which are made to pass through mortises in the side of the trough. to which they are fastened by pivot pins (*k*,) that pass down through holes (*l*) made in them for that purpose; the inner ends of these guides are so constructed as to form a funnel shaped passage flaring toward the piston, like a semi-truncated cone in form, the two, when united, forming the entire circle, as represented in Fig. 2. The opposite ends are drawn apart by means of springs (*m*,) affixed to the trough, which retain them in contact with sufficient firmness to guide the ear of corn to the point desired, and also allow them to expand freely as the ear passes through. Just beyond the guides (*i*,) the jaws (*n*, *o*,) against which the corn is shelled, is situated; they are four in number, and when closed, as shown in Fig. 2, form a circular edge, against which the ends of the ear is presented, and by which the corn is shelled from the cob while it is passing through the center between the jaws: these jaws are of two kinds, one marked (*n*) see Fig. 3, is the segment of a circle; at the edge and the sides of the shoulder project backward in a straight radial line for a short distance, and it then tapers down to a straight shank, which is of a proper length for the purpose required, it has a hole through it at (*n*,) just behind the edge, and laps over the projections or horns on the other segments (*o*,) hereafter to be described. The edge of the jaws (*o*,) are like those lettered *n*, but just behind them there are the angle × and the two projecting horns (*o'*), one on each side, the horns *o'* meet within the jaws (*n*); and when the jaws are expanded by a large ear, they will clear the cob of any rows of corn that may chance to pass between, and be left by the separated angles or corners of the jaws; they thus prevent the escape of any corn with the cob. By means of the angle × leaving a space between the front edge of the jaw and the horns *o'* these horns can be freely pressed down to the cob so as effectually to remove any remaining grains, which will not be the case when the edge of the jaw is continued in an oblique form to the point of the horns. The jaws are held in position by an iron plate (*p*) with a round hole in its center, around which four smaller holes of square or oblong form are made for the purpose of passing the shanks of the jaws through up to a shoulder (*q*) on each, to regulate them, and resist the force applied to their edges. The shanks of these jaws, like those of the guides, are drawn apart by springs (*r, r, r, r,*) which hold the edges together with a given force, and at the same time allow them to expand when required.

To shell corn in this machine, the operator sits upon the seat (*d,*) and turns the crank back and forth by one hand, while with the other he throws the ears into the trough; these ears require no other adjustment but to be thrown completely into the trough; and when they are driven forward by the piston, they enter the guides which present them in proper position to the shelling jaws, without regard to their size, and no further care is required.

Having thus fully described my improved apparatus for shelling corn, what I claim therein as new and for which I desire to secure Letters Patent, is—

1. The projections or horns *o'* with the angular notches ✕ between the horns and the front edge of the jaw, for removing the grains or rows of corn that pass between the angles of the jaws.

2. I claim in combination with the jaws the guides *i* constructed and operated as described for stripping the grain from the cob when moved forward by a piston or its mechanical equivalent.

ISRAEL J. RICHARDSON.

Witnesses:
L. D. GALE,
F. R. PEALE.